United States Patent
Ien

(10) Patent No.: US 10,795,625 B2
(45) Date of Patent: Oct. 6, 2020

(54) IMAGE FORMING APPARATUS, RESERVATION JOB MANAGING AND CONTROL PERFORMANCE RESTORATION

(71) Applicant: KYOCERA Document Solutions Inc., Osaka (JP)

(72) Inventor: Iyu Ien, Osaka (JP)

(73) Assignee: Kyocera Document Solutions, Inc. (JP)

( * ) Notice: Subject to any disclaimer, the term of this patent is extended or adjusted under 35 U.S.C. 154(b) by 0 days.

(21) Appl. No.: 16/443,280

(22) Filed: Jun. 17, 2019

(65) Prior Publication Data

US 2019/0391767 A1    Dec. 26, 2019

(30) Foreign Application Priority Data

Jun. 20, 2018  (JP) .................................. 2018-117469

(51) Int. Cl.
*G06F 3/12* (2006.01)

(52) U.S. Cl.
CPC ............ *G06F 3/126* (2013.01); *G06F 3/1205* (2013.01); *G06F 3/1267* (2013.01); *G06F 3/1273* (2013.01)

(58) Field of Classification Search
CPC ...... G06F 3/126; G06F 3/1205; G06F 3/1267; G06F 3/1273
USPC .......................................................... 358/1.1
See application file for complete search history.

(56) References Cited

U.S. PATENT DOCUMENTS

| 9,471,860 | B2 * | 10/2016 | Mihira | G06F 3/1229 |
| 2004/0190967 | A1 * | 9/2004 | Mizuno | G06F 3/1261 |
| | | | | 400/76 |
| 2006/0050307 | A1 * | 3/2006 | Koike | H04N 1/00002 |
| | | | | 358/1.15 |
| 2008/0239392 | A1 * | 10/2008 | Nanaumi | G06K 15/02 |
| | | | | 358/1.15 |
| 2010/0290088 | A1 * | 11/2010 | Ito | G03G 15/55 |
| | | | | 358/1.16 |
| 2011/0134459 | A1 * | 6/2011 | Funane | H04N 1/21 |
| | | | | 358/1.14 |
| 2014/0376024 | A1 * | 12/2014 | Masuyama | G06F 3/126 |
| | | | | 358/1.14 |
| 2016/0274827 | A1 * | 9/2016 | Kogusuri | G06F 3/1282 |
| 2018/0300089 | A1 * | 10/2018 | Ikuta | G03G 15/5075 |

FOREIGN PATENT DOCUMENTS

JP    2007-331178    12/2007

\* cited by examiner

*Primary Examiner* — Allen H Nguyen

(57) ABSTRACT

An image forming apparatus includes a controller and a reservation job managing unit. The controller is configured to perform a print job or a transmission job using a printing device or a communication device. The reservation job managing unit is configured to (a) register schedule data and job data of a reservation job that is a print job or a transmission job in a predetermined storage device, (b) determine whether the job data is stored in the storage device or not when a reservation time has come on the basis of the schedule data, and (c) notify a user of that the job data is not stored in the storage device if the job data is not stored in the storage device, and afterward cause the controller to perform the reservation job if the job data is restored in the storage device.

5 Claims, 3 Drawing Sheets

IMAGE FORMING APPARATUS, RESERVATION JOB MANAGING AND CONTROL PERFORMANCE RESTORATION

CROSS-REFERENCE TO RELATED APPLICATIONS

This application relates to and claims priority rights from Japanese Patent Application No. 2018-117469, filed on Jun. 20, 2018, the entire disclosures of which are hereby incorporated by reference herein.

BACKGROUND

1. Field of the Present Disclosure

The present disclosure relates to an image forming apparatus.

2. Description of the Related Art

An image forming apparatus detects a job start time of a document on the basis of a schedule of document printing, and if this document is a confidential document, then the image forming apparatus transmits a mail to a user upon the job start time, and afterward, if a password is inputted, the image forming apparatus performs printing the document. If another job is running at the job start time in the image forming apparatus, then the image forming apparatus temporarily stops this another job, and if further another job is issued, then the image forming apparatus keeps this further another job in a standby status.

However, in the aforementioned image forming apparatus, if data required for the job was removed due to file manipulation after setting the schedule and until the job start time, then the document is hardly printed.

SUMMARY

An image forming apparatus according to an aspect of the present disclosure includes a controller and a reservation job managing unit. The controller is configured to perform a print job or a transmission job using a printing device or a communication device. The reservation job managing unit is configured to (a) register schedule data and job data of a reservation job that is a print job or a transmission job in a predetermined storage device, (b) determine whether the job data is stored in the storage device or not when a reservation time has come on the basis of the schedule data, and (c) notify a user of that the job data is not stored in the storage device if the job data is not stored in the storage device, and afterward cause the controller to perform the reservation job if the job data is restored in the storage device.

These and other objects, features and advantages of the present disclosure will become more apparent upon reading of the following detailed description along with the accompanied drawings.

DETAILED DESCRIPTION

Hereinafter, an embodiment according to an aspect of the present disclosure will be explained with reference to drawings.

Figure 1:
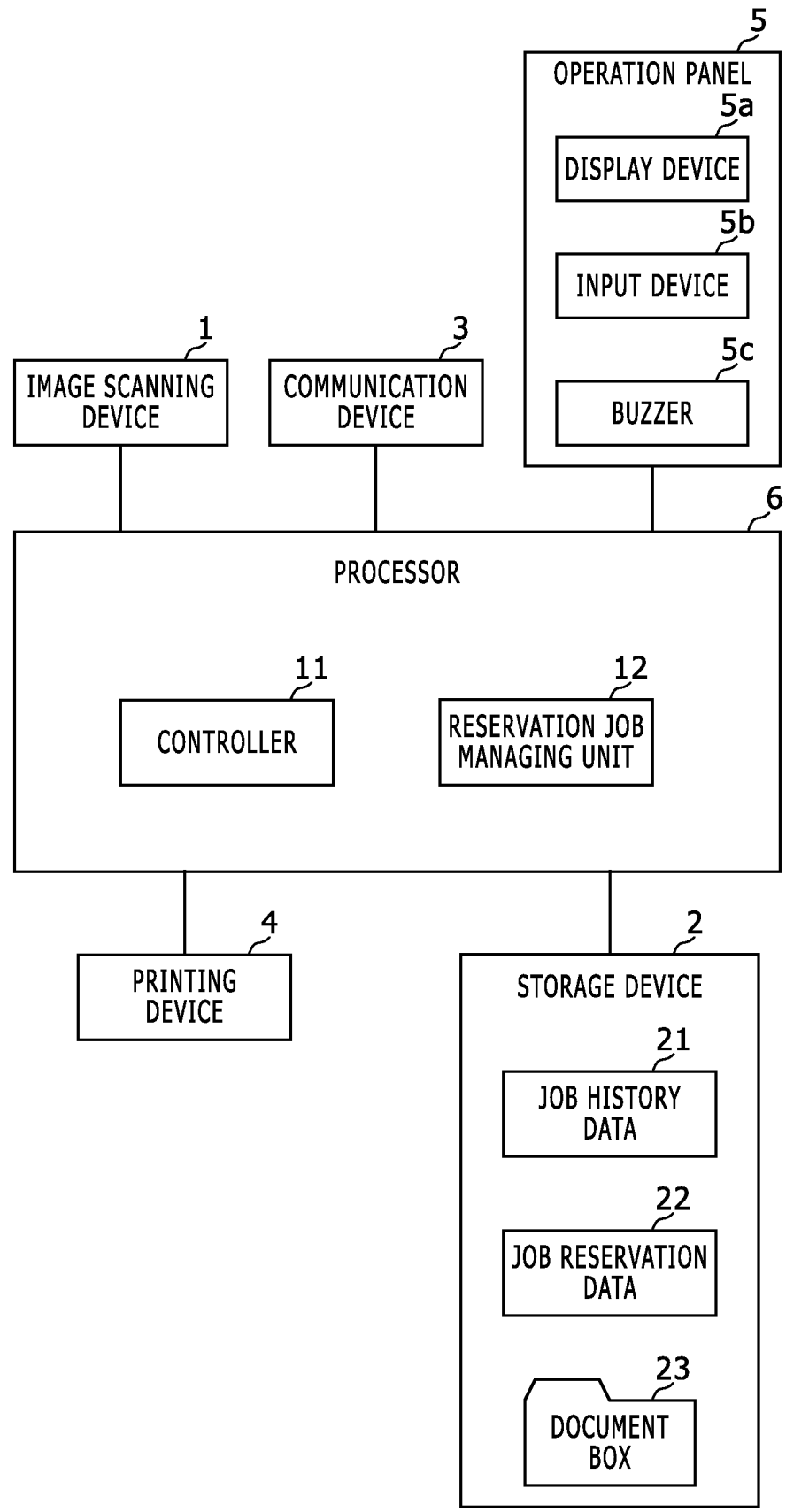
FIG. 1 shows a block diagram that indicates a configuration of an image forming apparatus according to an embodiment of the present disclosure.

FIG. 1 shows a block diagram that indicates a configuration of an image forming apparatus according to an embodiment of the present disclosure. The image processing apparatus shown in FIG. 1 is, for example, an image forming apparatus such as a multi function peripheral. The image processing apparatus shown in FIG. 1 includes an image scanning device 1, a storage device 2, a communication device 3, a printing device 4, an operation panel 5, and a processor 6.

The image scanning device 1 is an internal device that optically scans a document image of a document, and generates image data (RGB data, here) of the document image.

Further, the storage device 2 is a device capable of storing sorts of data and programs. A non-volatile storage medium with a large capacity is used as the storage device 2, such as non-volatile memory or hard disk drive. In the storage device 2, job history data 21 and job reservation data 22 are stored. Further, a document box 23 is set in the storage device 2.

The communication device 3 includes a modem, a network interface or the like, and performs data communication for facsimile transmission, file transmission or the like.

Further, the printing device 4 performs printing an image based on image data onto a printing paper sheet, for example, in an electrographic manner.

Furthermore, the operation panel 5 includes a display device 5a, such as a liquid crystal display, that displays sorts of screens to a user, an input device 5b, such as a touch panel or a hard key, that receives a user operation, and a buzzer 5c.

Furthermore the processor 6 is a computer that includes a CPU (Central Processing Unit), a ROM (Read Only Memory), a RAM (Random Access Memory) and the like, loads a program from the ROM, the storage device 2 or the like to the RAM, and executes the program with the CPU and thereby acts as various processing units. In this embodiment, the processor 6 acts as a controller 11 and a reservation job managing unit 12.

The controller 11 (a) receives a job request of a print job, a transmission job (i.e. a job of facsimile transmission, image file transmission, email transmission of an image file or the like) or the like, and upon receiving the job request, (b) performs a data process (raster process or the like) and/or an image process (screen process or the like) for the job request or image data specified by the job request and thereby generates image data for printing or transmission, and (c) performs the print job, the transmission job or the like based on the generated image data using the printing device 4 or the communication device 3. The controller 11 stores a history (job time and date, job type, a file path or file name of the job data and/or the like) of the performed job (print job, transmission job or the like) as the job history data 21 in the storage device 2.

The reservation job managing unit 12 registers schedule data and job data of a reservation job in the predetermined storage device 2 on the basis of a user operation to the operation panel 5. The reservation job is a print job or a transmission job. Specifically, the reservation job managing unit 12 stores (a) schedule data that indicates a reservation time, (b) a file path or file name of job data of the reservation job, and the like as the job reservation data 22 into the storage device 2, and stores job data such as image data into the document box 23.

Here the schedule data may be set such that the reservation job is repeatedly performed on regular basis (for example, performed at a predetermined time on every day, at predetermined time on a predetermined date in every month or the like), or may be set such that the reservation job is performed only once.

Further, the reservation job managing unit 12 (a) watches whether a reservation time has come or not on the basis of the schedule data, and (b) determines whether the job data of a reservation job is stored in the storage device 2 (the document box 23) or not when a reservation time of the reservation job has come; and (c) if the job data is not stored in the storage device 2 (the document box 23) then the reservation job managing unit 12 notifies a user of that the job data is not stored in the storage device 2 (the document box 23), and afterward causes to the controller 11 to perform the reservation job if the job data is restored in the storage device 2 (the document box 23).

In a case that the job data is not stored in the storage device 2 as mentioned, if performing another job is requested before the job data is restored in the storage device 2, then the controller 11 allows interruption for performing this another job. Therefore, in this case, if the job data is restored in the storage device 2, the reservation job is performed after performing this another job of the interruption. Further, if the job data is not restored in the storage device 2 at a time point that this another job of the interruption is finished, then the reservation job managing unit 12 continues the aforementioned error notification.

Further, the reservation job managing unit 12 detects a job performed on a regular basis on the basis of the job history data 21, and registers the detected job as the reservation job.

For example, if a job based on the same job data was performed on the first date in every month over three months (i.e. three times), then this job is detected and a reservation job is registered so as to be performed at a predetermined time on the first date in every month.

If a job performed on regular basis was detected, then the reservation job managing unit 12 may display on the operation panel 5 a message that prompts a user to register the detected job as a reservation job while the user logs in, or may transmit such a message as an email or the like to a user, and thereafter may register the detected job as a reservation job after a predetermined user operation to the operation panel 5 is detected.

The following part explains a behavior of the aforementioned image forming apparatus.

(a) Registering a Reservation Job

Figure 2:
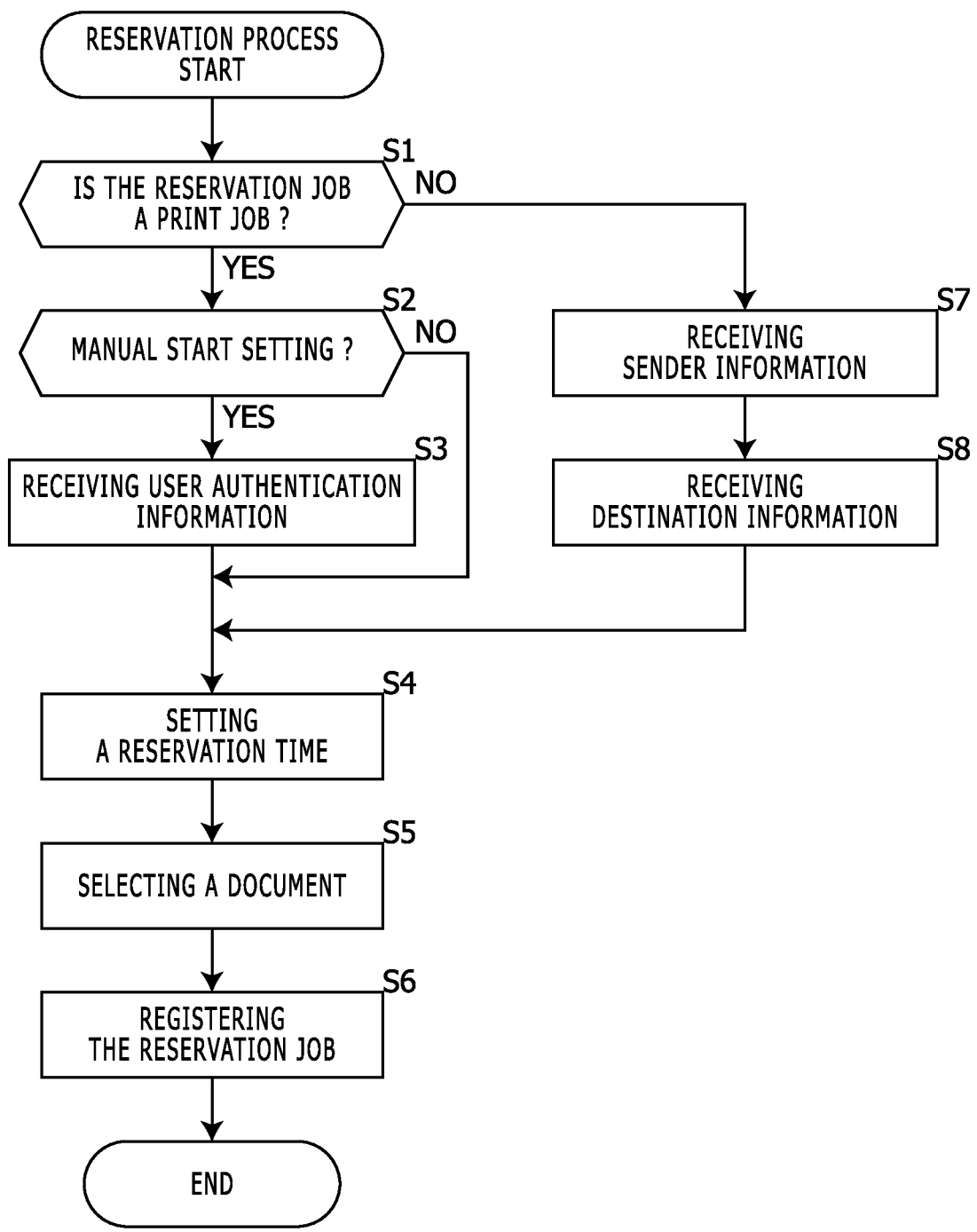
FIG. 2 shows a diagram that explains registering a reservation job in the image forming apparatus shown in FIG. 1.

FIG. 2 shows a diagram that explains registering a reservation job in the image forming apparatus shown in FIG. 1.

The reservation job managing unit 12 displays an operation screen for reservation job registration on the display device 5a, detects a user operation that specifies a job type of a reservation job to the operation screen with the input device 5b, and determines whether the reservation job is a print job or not (in Step S1).

If the reservation job is a print job, then the reservation job managing unit 12 detects a user operation that specifies a start setting of the reservation job to the operation screen with the input device 5b, and determines whether a manual start setting is selected by the user operation or not (in Step S2). The manual start setting requires an input of user authentication information (a user ID, a password and/or the like) for the start of performing the reservation job, and therefore if the manual start setting is selected, then the reservation job managing unit 12 detects a user operation that specifies the user authentication information to the operation screen with the input device 5b, and thereby receives the user authentication information (in Step S3). Contrarily, if the manual start setting is not selected, automatic start setting is selected. The automatic start setting does not require an input of user authentication information for the start of performing the reservation job, and therefore Step S3 is skipped.

Subsequently, the reservation job managing unit 12 detects a user operation that specifies a reservation time (i.e. a job start time) to the operation screen with the input device 5b (in Step S4), also detects a user operation that selects a document to be printed to the operation screen with the input device 5b (in Step S5), and registers the reservation time as schedule data in the job reservation data 22 and stores job data of the document in the document box 23 and thereby registers this reservation job (in Step S6).

Contrarily, if the reservation job is not a print job but a transmission job, then the reservation job managing unit 12 detects a user operation that specifies sender information (user name, facsimile number, server address, email address and/or the like) to the operation screen with the input device 5b (in Step S7), also detects a user operation that specifies destination information (user name, facsimile number, server address, email address and/or the like) to the operation screen with the input device 5b (in Step S8).

Subsequently, as well as for a print job, the reservation job managing unit 12 detects a user operation that specifies a reservation time (i.e. a job start time) to the operation screen with the input device 5b (in Step S4), also detects a user operation that selects a document to be transmitted to the operation screen with the input device 5b (in Step S5), and registers the reservation time as schedule data in the job reservation data 22 and stores job data of the document in the document box 23 and thereby registers this reservation job (in Step S6).

If the reservation job is a transmission job, then with regard to each reservation job, the sender information and the destination information required for the transmission of the image data or the like are registered in the job reservation data 22.

In the aforementioned manner, the reservation job is registered.

(b) Performing a Reservation Job

Figure 3:
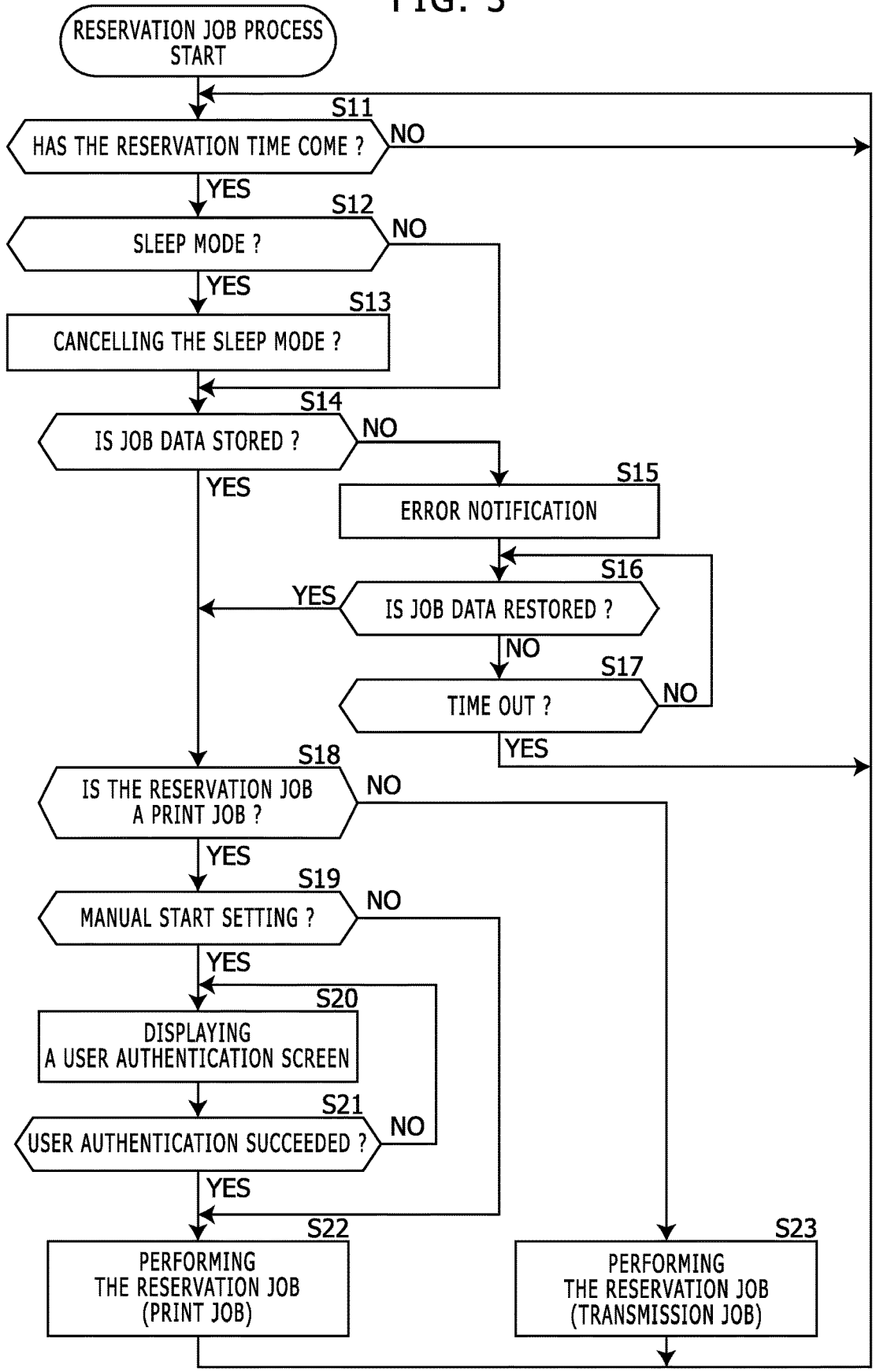
FIG. 3 shows a diagram that explains performing a reservation job in the image forming apparatus shown in FIG. 1.

FIG. 3 shows a diagram that explains performing a reservation job in the image forming apparatus shown in FIG. 1.

The reservation job managing unit 12 refers to the job reservation data 22 and watches whether a reservation time of a reservation job registered in the job reservation data 22 has come or not (in Step S11).

It should be noted that the image forming apparatus has a sleep mode function, and automatically moves to a sleep mode if a non-operation time length gets equal to or larger than a predetermined time, and cancels the sleep mode if a user operation or a job request from a remote host is detected. In the sleep mode, power supply is cut off for a part of internal devices of the image forming apparatus, and thereby the image forming apparatus performs electric power saving operation. Even in the sleep mode, the reservation job managing unit 12 continues the aforementioned watching of the reservation time.

When the reservation time of the reservation job has come, the reservation job managing unit 12 determines whether this image forming apparatus operates in the sleep mode or not (in Step S12), and cancels the sleep mode if this image forming apparatus operates in the sleep mode (in Step S13).

Subsequently, the reservation job managing unit 12 determines a storage location (here, the document box 23) of the job data of the reservation job on the basis of the job reservation data 22, and determines whether the job data of the reservation job is stored in the document box 23 or not (in Step S14).

If the job data of the reservation job is not stored in the document box 23, then the reservation job managing unit 12 performs error notification to a user (in Step S15). As the error notification, the reservation job managing unit 12 displays a warning message on the display device 5*a* and outputs a warning sound using the buzzer 5*c*. Further, if the reservation job is a transmission job, then in addition, as the error notification, the reservation job managing unit 12 also transmits a warning message to a user as an email or the like.

When the user notices the error notification, for example, the user operates a terminal device (not shown) and thereby stores image data as the job data into the document box 23 from the outside or operates this image forming apparatus and thereby makes a copy of image data stored in another document box into the document box 23. Consequently, the job data in the document box 23 is restored.

After the error notification, the reservation job managing unit 12 watches whether the job data in the document box 23 is restored or not (in Step S16), and watches whether a predetermined time elapses or not from starting the error notification (i.e. timeout or not) (in Step S17). If the timeout is detected in Step S17, then the reservation job managing unit 12 cancels performing this reservation job.

If the job data is restored, then the reservation job managing unit 12 determines whether the reservation job is a print job or not on the basis of the job reservation data 22 (in Step S18).

If the reservation job is a print job, then the reservation job managing unit 12 determines whether the manual start setting is set or not on the basis of the job reservation data 22 (in Step S19). If the manual start setting is set, then the reservation job managing unit 12 displays a user authentication screen on the display device 5*a* (in Step S20), performs a user authentication process that determines whether user authentication information inputted to this user authentication screen agrees with the user authentication information specified in the reservation job registration (in Step S21), and if the user authentication is succeeded, the reservation job managing unit 12 causes the controller 11 to perform the reservation job (in Step S22). Contrarily, if the manual start setting is not set, then the reservation job managing unit 12 causes the controller 11 to immediately perform the reservation job (in Step S22).

Contrarily, if the reservation job is a transmission job, then the reservation job managing unit 12 causes the controller 11 to immediately perform the reservation job (in Step S23).

In the aforementioned manner, the reservation job is performed.

As mentioned, in the aforementioned embodiment, the controller 11 performs a print job or a transmission job using the printing device 4 or the communication device 3. The reservation job managing unit 12 (a) registers schedule data and job data of a reservation job (that is a print job or a transmission job) in the predetermined storage device 2, (b) determines whether the job data is stored in the storage device 2 or not when a reservation time has come on the basis of the schedule data, and (c) notifies a user of that the job data is not stored in the storage device 2 if the job data is not stored in the storage device, and afterward causes the controller 11 to perform the reservation job if the job data is restored in the storage device 2.

Consequently, even if data required for the reservation job does not exist when the reservation job should be performed, a user can restore the data and causes the apparatus to perform the reservation job.

It should be understood that various changes and modifications to the embodiments described herein will be apparent to those skilled in the art. Such changes and modifications may be made without departing from the spirit and scope of the present subject matter and without diminishing its intended advantages. It is therefore intended that such changes and modifications be covered by the appended claims.

For example, in the aforementioned embodiment, the reservation job managing unit 12 may store the job data of the reservation job into a document box in another image forming apparatus through a network using the communication device 3, and when the reservation job is to be performed, the controller 11 may acquire the job data from the document box in this another image forming apparatus through the network using the communication device 3.

What is claimed is:

1. An image forming apparatus, comprising:
   a controller configured to perform a print job or a transmission job using a printing device or a communication device; and
   a reservation job managing unit configured to (a) register schedule data and job data of a reservation job that is a print job or a transmission job in a predetermined storage device, (b) determine whether the job data is stored in the storage device or not when a reservation time has come on the basis of the schedule data, and (c) notify a user of that the job data is not stored in the storage device if the job data is not stored in the storage device, and afterward cause the controller to perform the reservation job if the job data is restored in the storage device.

2. The image forming apparatus according to claim 1 wherein in a case that the job data is not stored in the storage device, if performing another job is requested before the job data is restored in the storage device, the controller allows interruption for performing the another job.

3. The image forming apparatus according to claim 1 wherein the schedule data is set such that the reservation job is repeatedly performed on a regular basis.

4. The image forming apparatus according to claim 1 wherein the controller records as job history data a history of a performed print job or a performed transmission job; and
   the reservation job managing unit detects a job performed on a regular basis on the basis of the job history data, and registers the detected job as the reservation job.

5. The image forming apparatus according to claim 1 wherein the storage device is a document box arranged in another image forming apparatus; and
   the controller acquires the job data from the document box in the another image forming apparatus for performing the reservation job.

* * * * *